US009834057B2

(12) United States Patent
Drozdowski et al.

(10) Patent No.: US 9,834,057 B2

(45) Date of Patent: Dec. 5, 2017

(54) SUSPENSION STABILIZATION SYSTEM AND RELATED METHODS

(71) Applicant: FORD GLOBAL TECHNOLOGIES, LLC, Dearborn, MI (US)

(72) Inventors: James Adam Drozdowski, Canton, MI (US); Joe L Buchwitz, Huntington Woods, MI (US); Bruce C Arnold, Whitmore Lake, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/932,197

(22) Filed: Nov. 4, 2015

(65) Prior Publication Data

US 2017/0120713 A1 May 4, 2017

(51) Int. Cl.

| | |
|---|---|
| ***B60G 17/016*** | (2006.01) |
| ***B60G 3/06*** | (2006.01) |
| ***B60G 17/02*** | (2006.01) |

(52) U.S. Cl.

CPC ........... *B60G 17/0162* (2013.01); *B60G 3/06* (2013.01); *B60G 17/025* (2013.01); *B60G 2200/142* (2013.01); *B60G 2202/42* (2013.01); *B60G 2204/45* (2013.01); *B60G 2206/427* (2013.01); *B60G 2400/0511* (2013.01); *B60G 2400/104* (2013.01); *B60G 2400/412* (2013.01)

(58) Field of Classification Search

CPC .... B60G 17/0162; B60G 3/06; B60G 17/025; B60G 2200/142; B60G 2206/427; B60G 2400/0511; B60G 2204/45; B60G 2202/42; B60G 2400/104; B60G 2400/412

See application file for complete search history.

(56) References Cited

U.S. PATENT DOCUMENTS

| | | | | |
|---|---|---|---|---|
| 6,428,019 | B1 * | 8/2002 | Kincad | B60G 21/0553 280/124.106 |
| 6,513,819 | B1 * | 2/2003 | Oliver | B60G 21/0553 280/124.106 |
| 6,637,757 | B2 * | 10/2003 | Ignatius | B60G 17/0185 280/124.106 |
| 7,798,498 | B2 | 9/2010 | Buma | |
| 7,896,360 | B2 | 3/2011 | Buma | |
| 8,511,697 | B2 | 8/2013 | Ohletz et al. | |
| 2004/0232632 | A1 * | 11/2004 | Beck | B60G 17/016 280/5.5 |
| 2007/0108707 | A1 * | 5/2007 | Kobayashi | B60G 17/0162 280/5.511 |
| 2008/0007023 | A1 * | 1/2008 | Anderten | B60G 17/015 280/124.106 |

(Continued)

FOREIGN PATENT DOCUMENTS

| | | |
|---|---|---|
| JP | 2006082751 A | 3/2006 |

*Primary Examiner* — Darlene P Condra

(74) *Attorney, Agent, or Firm* — Jones Robb, PLLC; Raymond L. Coppiellie

(57) ABSTRACT

A suspension stabilization system may include a stabilizer bar having an end configured to connect to a suspension component of a vehicle, and a torsion shaft with an end connected to the stabilizer bar. A locking mechanism may be configured to rotationally couple and decouple at least a portion of the torsion shaft with a portion of a frame of the vehicle. Methods relate to stabilizing a vehicle suspension.

20 Claims, 4 Drawing Sheets

(56) References Cited

U.S. PATENT DOCUMENTS

| | | | | |
|---|---|---|---|---|
| 2008/0106055 | A1* | 5/2008 | Pinkos | B60G 3/20 280/124.106 |
| 2013/0307241 | A1* | 11/2013 | Brown | B60G 21/106 280/124.107 |
| 2015/0014955 | A1 | 1/2015 | Leibl | |
| 2015/0290996 | A1* | 10/2015 | Miyamoto | B60G 21/055 280/124.107 |
| 2016/0017932 | A1* | 1/2016 | Gilmore | F16D 11/10 192/84.92 |

* cited by examiner

SUSPENSION STABILIZATION SYSTEM AND RELATED METHODS

TECHNICAL FIELD

The present disclosure relates generally to a suspension stabilization system for an anti-roll suspension system of a vehicle, for example, motor vehicles, and more particularly to an anti-roll suspension system having of a pair of independently mounted stabilizer devices, which may be selectively engaged to control vehicle roll.

BACKGROUND

Traditional vehicle suspension systems include resilient devices (e.g., coil springs, leaf springs, dampers, etc.) configured to absorb road shock and other vibrations while providing a smooth and comfortable ride for vehicle occupants. When a vehicle travels around a corner, centrifugal forces acting on the vehicle tend to cause a sprung portion (i.e., the portion of the vehicle supported by the suspension system) of the vehicle to roll. In severe instances, the effects of vehicle body roll can cause instability and/or impede an ability of a vehicle driver to control the vehicle.

In order to prevent excessive vehicle body roll, for example, when the vehicle negotiates turns, particularly at high speeds, the vehicle may be equipped with a solid or hollow steel anti-roll/stabilizer bar that connects laterally across the vehicle to increase roll rigidity and/or improve the steering stability of the vehicle. For example, the stabilizer bar may be a torsion bar that extends laterally across the vehicle where it is attached to the frame of the vehicle on each side of the frame, yet is free to rotate relative to the frame. At its ends, the stabilizer bar has torque arms, which are attached to control arms or struts which carry the steering knuckles. Articulation of the suspension on one side of the vehicle applies a force through the stabilizer bar tending to articulate the suspension on the other side of the vehicle in the same direction. Consequently, the stabilizer bar urges both sides of the vehicle suspension to articulate in the same direction, thereby modulating roll of the vehicle-body.

However, conventional stabilizer bars may compromise the ride comfort of occupants in the vehicle by impeding independent articulation of the suspension even when there is no need for modulation of body roll, such as when the vehicle is traversing a substantially straight path. Furthermore, conventional stabilizer bars extend transversely across the vehicle, and may undesirably constrain the location and/or configuration of other vehicle components, such as driveline components, fuel systems, subframe structures, seat packages, spare tires, etc.

Therefore, it is desirable to provide a stabilization device that prevents excessive roll of the vehicle body under steering maneuvers and other lateral acceleration events without compromising independent articulation of the vehicle suspension when the vehicle is following a substantially straight path. Moreover, it is desirable to provide a stabilization device that eases packaging constraints with respect to other components of the vehicle.

SUMMARY

In accordance with various exemplary embodiments, the present disclosure provides a suspension stabilization system, comprising a stabilizer bar having an end configured to connect to a suspension component of a vehicle, a torsion shaft with an end connected to the stabilizer bar, and a locking mechanism configured to rotationally couple and decouple at least a portion of the torsion shaft with a portion of a frame of the vehicle when the locking mechanism is in an engaged position.

In accordance with exemplary embodiments, the present disclosure also provides a vehicle with a suspension stabilization device. The suspension stabilization device includes a stabilizer bar connected to a suspension component of the vehicle, a torsion shaft connected to the stabilizer bar, and a locking mechanism configured to rotationally couple and decouple at least a portion of the torsion shaft to a portion of a frame of the vehicle.

In accordance with exemplary embodiments, the present disclosure also provides a method for stabilizing a vehicle suspension. The method includes transmitting to an electronic control unit data relating to at least one of a steering angle of the vehicle, a body roll angle of the vehicle, a yaw rate of the vehicle, and a lateral acceleration of the vehicle, and engaging a locking mechanism to prevent rotational movement of at least a portion of a torsion shaft of the suspension stabilization device relative to a frame portion of the vehicle when at least one of the steering angle exceeds a predetermined steering angle limit stored in the electronic control unit, the body roll angle exceeds a predetermined body roll angle limit stored in the electronic control unit, the yaw rate exceeds a predetermined yaw rate stored in the electronic control unit, and/or the lateral acceleration exceeds a predetermined lateral acceleration limit stored in the electronic control unit.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
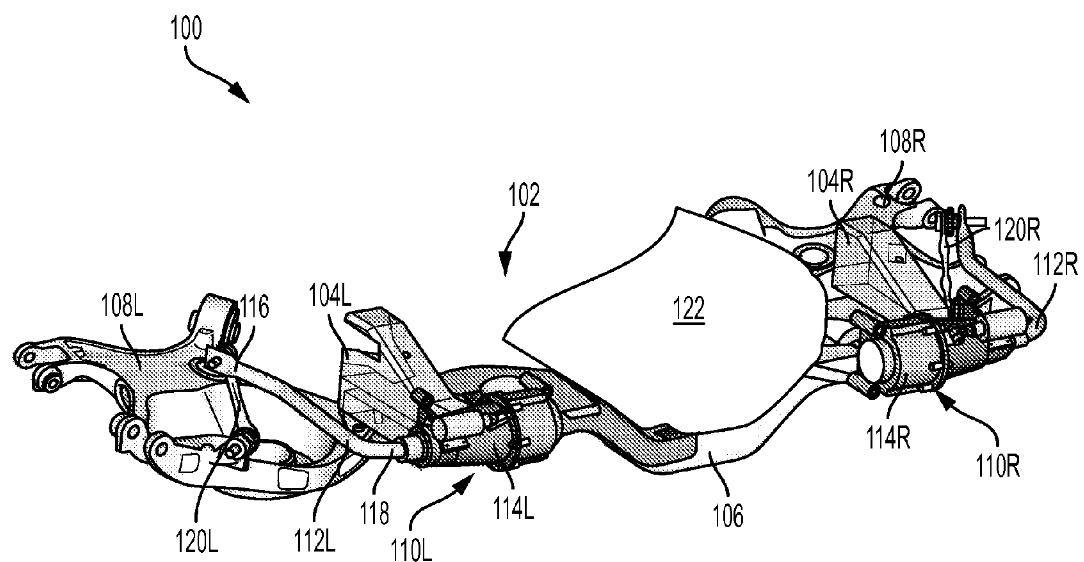
FIG. 1 is a perspective view of a vehicle suspension system including a pair of anti-roll stabilizer devices in accordance with an exemplary embodiment of the disclosed subject matter.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. The features explained individually in the description can be mutually combined in any technically expedient manner and disclose additional embodiments of the present disclosure.

The present disclosure provides a suspension stabilization system configured to modulate roll of the vehicle body under lateral acceleration conditions, while permitting independent articulation of the vehicle suspension under other conditions, such as when the vehicle is traveling along a substantially straight path. In particular, the suspension stabilization system may include one or more independently mounted, selectively engagable suspension stabilization (e.g., roll modulation) devices.

Engagement and disengagement of the roll modulation devices may be controlled by an electronic processor, such as an electronic control unit (ECU) of the vehicle, based on operating conditions such as steering angle, yaw rate, lateral acceleration, body roll angle, vehicle speed, ride height, and/or other parameters. Engagement of the one or more roll modulation devices may modulate roll of the vehicle body under lateral acceleration conditions, while disengagement of the one or more roll modulation devices may allow independent articulation of the vehicle suspension.

Figure 6:
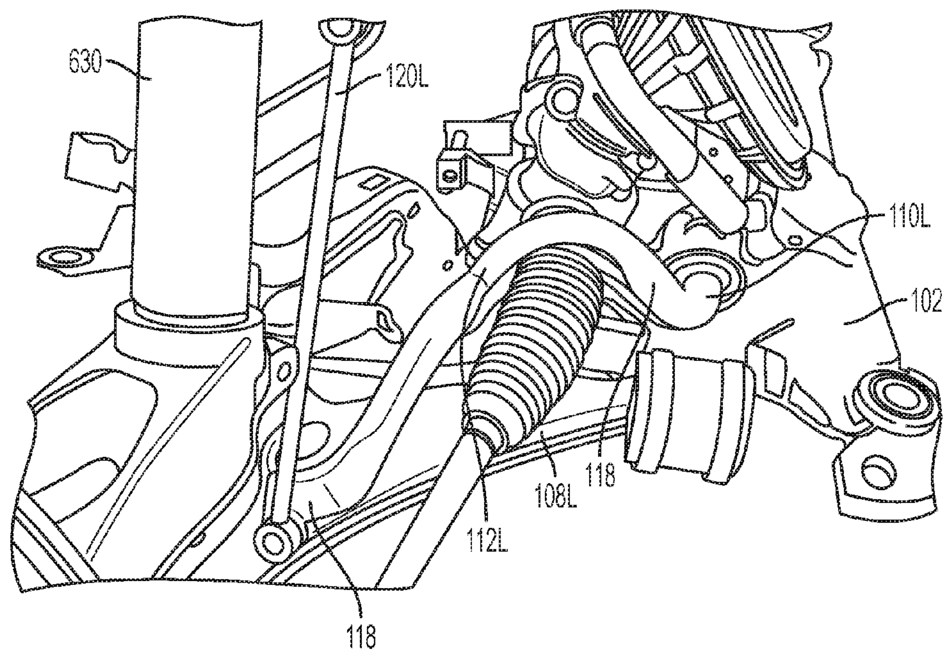
FIG. 6 is a perspective view of an anti-roll stabilizer device according to the embodiment of FIGS. 1 and 2 or FIGS. 3 and 4 with an end of the stabilizer device connected to a strut by an end link.

Referring now to the drawings, FIG. 1 shows an exemplary independent, anti-roll vehicle suspension system 100, which may form a portion of a vehicle. The vehicle suspension system 100 includes a vehicle frame structure 102 that includes a pair of longitudinal side rails 104L, 104R, and a crossmember 106. At each wheel (not shown) of the vehicle, the vehicle suspension system 100 may include suspension components, such as control arms 108L, 108R pivotally attached to the frame structure 102. The frame structure 102 may comprise a portion of a unibody structure, a subframe, a ladder frame, or another structure. Other suspension components, such as a strut assembly (such as strut 630 shown in FIG. 6), which may include, e.g., a helical coil spring and a damper, may be positioned between an intermediate portion of each of the control arms 108L, 108R and a portion of the frame structure 102 to support the weight of the vehicle body (not shown) and any loads that are transmitted through the control arms 108L, 108R. Steering knuckles (not shown) may be attached to the control arms 108L, 108R. A hub and rotor assembly (not shown) may be rotatably attached to a spindle portion of each steering knuckle for mounting of a wheel and tire (not shown). Other components of the vehicle, such as a portion of a powertrain represented schematically by reference number 122, may be disposed in the vehicle, e.g., between longitudinal side rails 104L, 104R.

The vehicle suspension system 100 may include one or more suspension stabilization devices, e.g., suspension stabilization devices 110L and 110R. Each suspension stabilization device 110L and 110R may be configured to mitigate body roll of the vehicle and maintain (e.g., enhance) steering stability of the vehicle, as described further below. Each suspension stabilization device 110L, 110R may be mounted on a portion of the vehicle frame structure 102. For example, each suspension stabilization device 110L, 110R may be mounted to one or more of the longitudinal side rails 104L, 104R and the crossmember 106. Other embodiments may include additional and/or different frame (e.g., unibody) components to which the suspension stabilization devices 110L, 110R may be mounted.

Each suspension stabilization device 110L, 110R may include an outer bar element (e.g., outer bar elements 112L, 112R, respectively) extending from a respective electronically engagable torsion module 114L, 114R connected to the vehicle-frame structure 102 and/or body as described above. Each of the outer bar elements 112L, 112R may include a first end 116 and second end 118. The first end 116 may be connected to a respective stabilizer bar link 120L, 120R, and the second end 118 may be connected to a respective electronically engagable torsion module 114L, 114R. Each stabilizer bar link 120L, 120R may be connected to a respective control arm 108L, 108R. In some embodiments, each stabilizer bar link 120L, 120R may be connected to a suspension component other than a control arm, such as a strut (e.g., strut 630 shown in FIG. 6), an axle assembly, etc.

The suspension stabilization devices 110L, 110R may have no mechanical link to one another aside from the portion of the vehicle frame structure 102 to which they are attached. In other words, unlike a conventional stabilizer bar, which includes a physical structure extending from one side of the vehicle to the other, the suspension stabilization devices 110L, 110R may be separate and independent units with no functional physical structure required therebetween.

Figure 2:
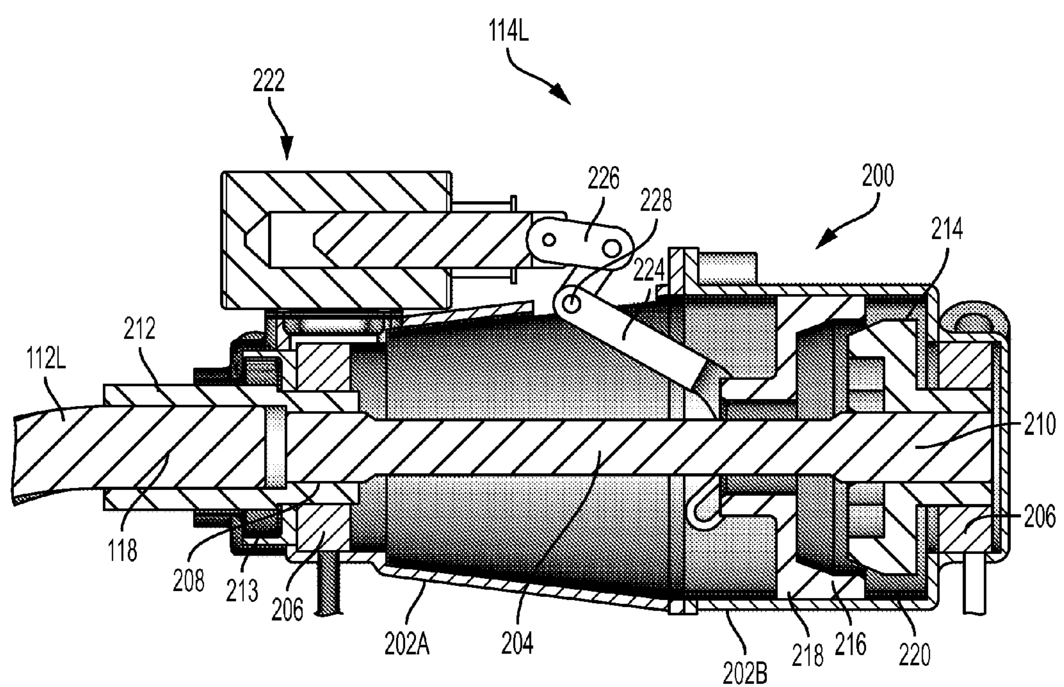
FIG. 2 is a partial cross-sectional side view of one of the anti-roll stabilizer devices illustrated in FIG. 1.

Referring now to FIG. 2, a cross-sectional view of the electronically engagable torsion module 114L of FIG. 1 is shown. While only the electronically engagable torsion module 114L is illustrated in FIG. 2, the electronically engagable torsion modules 114L and 114R shown in FIG. 1 may include similar or substantially identical components and functionality. The electronically engagable torsion module 114L may include a torque rod locking assembly 200 retained in a housing, such as that defined by first and second housing portions 202A and 202B, respectively.

One or both of the first housing portion 202A and the second housing portion 202B may be rigidly affixed to the frame structure 102. For example, in some embodiments, one or both of the first housing portion 202A and the second housing portion 202B may be affixed to the frame structure 102 with hardware (e.g., bolts), welded, or affixed by other methods.

The torque rod locking assembly 200 includes a torque rod 204 (which may also be characterized as a torsion shaft or a torsion rod) rotatably supported in the first and second housing portions by bearings 206 positioned at a first end 208 and a second end 210 of the torque rod 204. The torque rod 204 may comprise a material with a suitable elastic modulus, such as steel, other metal alloys, composite materials, etc.

The first end 208 of the torque rod 204 may include a sleeve assembly 212 configured to accept a portion of the outer bar element 112L, such as the second end 118 of the outer bar element 112L. The sleeve assembly 212 may be configured to rotationally couple the second end 118 of the outer bar element 112L to the torque rod 204. The sleeve assembly 212 may include, for example, a splined inside diameter corresponding to a splined outer diameter of the second end 118 of the outer bar element 112L. In other embodiments, the sleeve assembly 212 and the second end 118 of the outer bar element 112L may include respective portions of a keyed interface, an interference fit, a weld, or another suitable interface that rotationally couples the torque rod 210 with the outer bar element 112L. In yet other embodiments, the torque rod 204 and the outer bar element 112L may be formed integrally. In other words, in some embodiments, the torque rod 204 and the outer bar element 112L may be a single, unitary component.

A tone ring 213 and an associated sensor (not shown) positioned near the sleeve assembly 212 may generate a signal representing the rotational position of the first end 208 of the torque rod 204 relative to the first housing portion 202A. Information regarding the rotational position of the first end 208 of the torque rod 204 relative to the first housing portion 202A may be transmitted to an electrical processor (not shown), such as an electronic control unit (ECU) associated with the vehicle. In some embodiments, the tone ring 213 and the associated sensor may be used to provide ride height data (e.g., data relating to the vertical position of each wheel relative to the vehicle body) to the ECU. Additionally or alternatively, in some embodiments, data relating to the rotational position of the first end 208 of the torque rod 204 relative to the first housing position 202A may be supplied by other sensors, e.g., ride height sensors at each wheel of the vehicle.

The torque rod locking assembly 200 may include a locking mechanism configured to selectively rotationally couple and decouple a portion of the torque rod 204 with the vehicle frame structure 102. For example, a locking mechanism may be configured to selectively rotationally couple and decouple the second end 210 of the torque rod 204 with the vehicle frame structure through one or both of the first housing portion 202A and the second housing portion 202B.

As shown in the embodiment of FIG. 2, the torque rod locking assembly 200 may include a pinion gear 214 connected to the torque rod 204 and a sliding lock gear 216. The sliding lock gear 216 and the first and second housing portions 202A and 202B may include features configured to allow the sliding lock gear 216 to move axially (e.g., along a longitudinal axis of the torque rod 204) within the first and/or second housing portions 202A and 202B while preventing rotational movement (e.g., rotational movement about the longitudinal axis of the torque rod 204) of the sliding lock gear 216. For example, the sliding lock gear 216 may include protrusions 218 positioned within complementary recesses 220 of one or both of the first and second housing portions 202A and 202B. Mechanical interaction between the protrusions 218 and interior surfaces of the recesses 220 may prevent rotational movement of the sliding lock gear 216.

Movement of the sliding lock gear 216 may be controlled by a solenoid 222 connected to an actuator fork 224 by a link 226. The actuator fork 224 may be connected to the first housing portion 202A at a pivot 228. Actuation of the solenoid 222 may cause the actuator fork 224 to rotate about the pivot 228, urging the sliding lock gear 216 into contact with the pinion gear 214. Interaction between complementary gear teeth (not illustrated) of the pinion gear 214 and the sliding lock gear 216 may engage, thereby rotationally coupling the second end 210 of the torque rod 204 with the first and second housing portions 202A, 202B through mechanical interaction between the pinion gear 214, the sliding lock gear 216, and the second housing portion 202B.

In the embodiment of FIG. 2, the solenoid 222 may be an electronic solenoid configured to be energized by an electrical current supplied or triggered by the ECU based on conditions and parameters discussed in further detail below. In other embodiments, movement of the sliding lock gear 216 may be controlled by a hydraulic actuator such as a hydraulic cylinder or hydraulic motor based on signals from a hydraulic, or combination hydraulic and electronic, control system.

When the sliding lock gear 216 is engaged with the pinion gear 214 (in other words, when the torque rod locking assembly 200 is engaged), forces applied to a wheel (not shown) may be transferred from, for example, the control arm 108L, through the stabilizer bar link 120L, the outer bar element 112L, the torque rod 204, and the second housing portion 202B to the vehicle frame 102 (FIG. 1). Stated another way, when the sliding lock gear 216 is engaged with the pinion gear 214, stiffness of at least the outer bar element 112L and the torque rod 204 resists movement of the vehicle suspension system 100. Articulation of the vehicle suspension system 100 when the sliding lock gear is engaged with the pinion gear 214 may be constrained by elastic deformation characteristics of the torque rod 204 and the outer bar element 112L.

When the torque rod locking assembly 200 is disengaged, the torque rod 204 is free to rotate within first and second housing portions 202A, 202B on the bearings 206. Articulation of the vehicle suspension system 100 may be controlled by a spring and damper assembly (e.g., a strut) associated with the particular corner of the vehicle suspension system 100 as the torque rod 204 rotates freely in the first and second housing portions 202A, 202B.

In some embodiments, a separate suspension stabilization device 110L, 110R may be associated with each wheel of a vehicle. For example, a four-wheeled vehicle may include four suspension stabilization devices, one at each wheel. Control of each torque rod locking assembly 200 associated with each vehicle wheel may be based on data related to vehicle motion and intended path collected by various vehicle sensors and transmitted to the ECU. For example, control of each torque rod locking assembly 200 may be based on signals relating to steering wheel angle, lateral and/or longitudinal acceleration, yaw rate, body roll, ride heights at individual wheels, etc.

When parameter values such as relatively low or zero lateral acceleration, relatively low or zero (e.g., straight ahead) steering wheel angle, relatively low or zero yaw rate, etc. indicate that the vehicle is traversing a straight path, each torque rod locking assembly 200 may be unlocked, allowing the vehicle suspension system 100 to respond to irregularities in a surface traversed by the vehicle independently at each wheel. As the torque rods 204 are free to rotate within the housing portions 202A, 202B, articulation of the suspension at each corner of the vehicle may be based substantially on the response characteristics of the spring and damper (e.g., strut assembly) associated with each wheel, and the suspension components at each corner may be free to articulate independently of one another.

When parameter values such as a relatively high level of lateral acceleration, a relatively high steering wheel angle, relatively high yaw rate, and/or other parameters indicate that the vehicle may be traversing a curved path, one or more of the torque rod locking assemblies 200 may be engaged. Forces applied to the suspension system 100 as lateral acceleration causes the sprung mass of the vehicle to roll about a roll center may be transferred through the stabilizer links 120L, 120R, through the outer bar portions 112L, 112R, and to the torque rods 204. Engagement of the torque rod locking assembly 200 transfers suspension forces from the torque rods 204, through the housing portions 202A, 202B to the frame portion 102 of the vehicle. Articulation of the suspension system 100 is thereby constrained by the torsional stiffness of the torque rods 204 and the torsional and/or bending stiffness of the outer bar portions 112L, 112R. In this manner, engaging the torque rod locking assemblies 200 increases the roll stiffness of the vehicle suspension system 100 (FIG. 1) relative to the roll stiffness of the vehicle suspension system 100 when the torque rod locking assemblies 200 are disengaged. The increased roll stiffness may contribute to improved handling (e.g., greater lateral acceleration) and improved steering stability compared to characteristics of the vehicle when the torque rod locking assemblies 200 are disengaged.

Additional or alternative parameters and schemes may be used to control the engagement and disengagement of the torque rod locking assemblies 200. For example, the torque rod locking assemblies 200 may remain unlocked below a particular threshold speed regardless of steering wheel angle. Additionally, engagement of the torque rod locking assemblies may be based on a suspension control scheme chosen by the user of the vehicle. For example, in some embodiments, the vehicle may include a user-selectable mode (e.g., an "off road" mode) in which the torque rod locking assemblies may remain unlocked regardless of steering wheel angle and vehicle speed to allow independent articulation of the vehicle wheels over irregular terrain. As another example, the vehicle may include other user selectable modes (e.g., "comfort," "sport," "touring," etc.), between which modes the parameters and/or timing of engagement of the torque rod locking assemblies may be altered. For example, in a "comfort" mode, engagement of the torque rod locking assemblies may be configured to allow a relatively large amount of body roll, thereby allowing additional articulation of the vehicle suspension for greater comfort over irregular road surfaces. In a "sport" mode, engagement of the torque rod locking assemblies may be configured to result in less body roll compared to "comfort" mode, resulting in more responsive handling (e.g., greater possible lateral acceleration) and improved steering stability. Other parameters, conditions, and settings may be used to control the engagement of the torque rod locking assemblies 200.

The stiffness of the torque rod locking assemblies 200 and the resulting roll stiffness of the vehicle suspension system 100 (FIG. 1) when the torque rod locking assemblies 200 are engaged may be adjusted by altering the geometry and/or material of the torque rod 204 associated with each torque rod locking assembly 200. For example, a relatively larger diameter torque rod 204 may provide greater stiffness than a relatively smaller diameter torque rod 204. Accordingly, similar or identical torque rod locking assemblies may be tailored to vehicles with different weights and/or desired handling characteristics by including a torque rod 204 tailored specifically to the particular application within each torque rod locking assembly 200. Additionally, the outer bar elements 112L, 112R (FIG. 1) may also be configured to have a specific stiffness characteristic by, e.g., altering a diameter or other geometry of the outer bar element. In some embodiments, one or both of the torque rod 204 and the outer bar elements 112L, 112R may be hollow, e.g., to provide weight savings over a solid component with similar stiffness.

Figure 3:
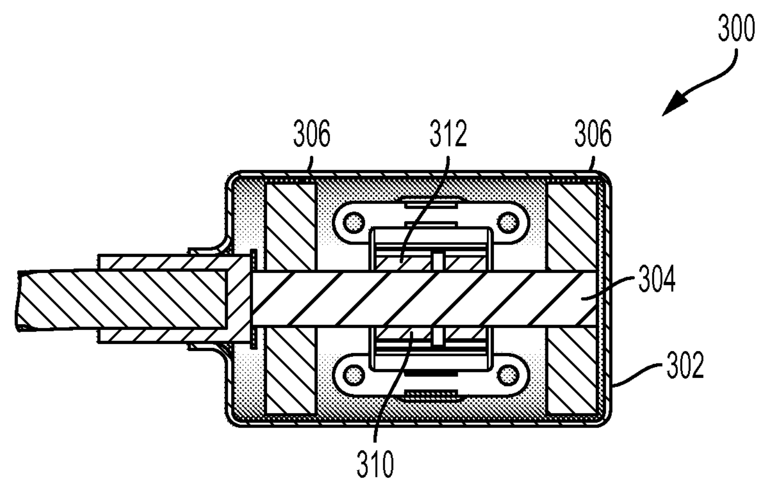
FIG. 3 is a cross-sectional side view of an anti-roll stabilizer device according to another exemplary embodiment of the disclosed subject matter.
Figure 4:
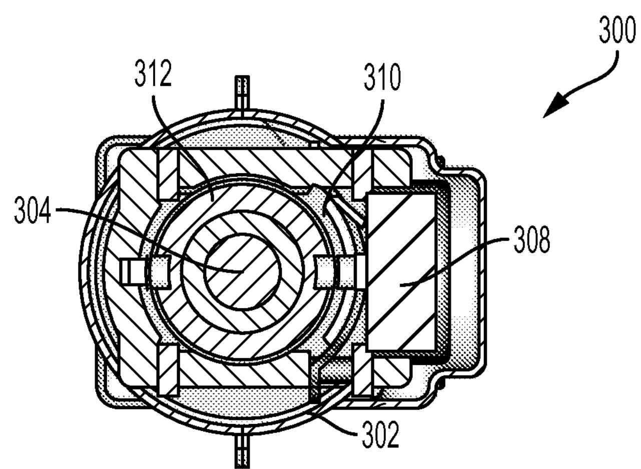
FIG. 4 is another cross-sectional side view of the anti-roll stabilizer device as illustrated in FIG. 3.

Referring now to FIGS. 3 and 4 concurrently, another embodiment of a torque rod locking assembly 300 is shown. In this embodiment, the torque rod locking assembly 300 includes a housing 302 and a torque rod 304 at least partially disposed within the housing 302 and supported by bearings 306. A solenoid 308 is configured to engage a friction pad 310 with a friction bushing 312 disposed on a portion of the torque rod 304. For example, the friction bushing 312 may be disposed around an outer diameter of the torque rod 304. The friction bushing 312 may have a larger outer diameter than the torque rod 304 to improve a mechanical advantage of the friction pad 310 against the friction bushing 312. When engaged, the solenoid 308 engages the friction pad 310 with the friction bushing 312 and prevents rotational movement of the torque rod 304 with respect to the housing 302 through friction between the friction pad 310 and the friction bushing 312. The friction pad 310 may comprise materials such as non-metallic, metallic, or ceramic friction materials. The friction bushing 312 may comprise a metal or metal alloy such as steel, bronze, etc. In other respects, functionality and control of the torque rod locking assembly 300 may be similar to that described above in connection with the torque rod locking assembly 200 (FIGS. 1 and 2). In other embodiments, a torque rod locking assembly may include any other type of locking mechanism, such as a friction disk clutch with a corresponding pressure plate, sliding pins that enter recesses formed in the torque rod when engaged, etc.

Some embodiments may include an engagement mechanism utilizing magnetorheological fluid. For example, a torque rod may include a splined end configured to rotate freely within a splined recess of a housing. A magnetorheological or electrorheological fluid may be disposed in a gap between the splined end of the torque rod and the splined recess. Energizing the fluid by application of an electric current or a magnetic field may increase the viscosity of the fluid and prevent rotation of the torque rod within the splined housing.

Figure 5:
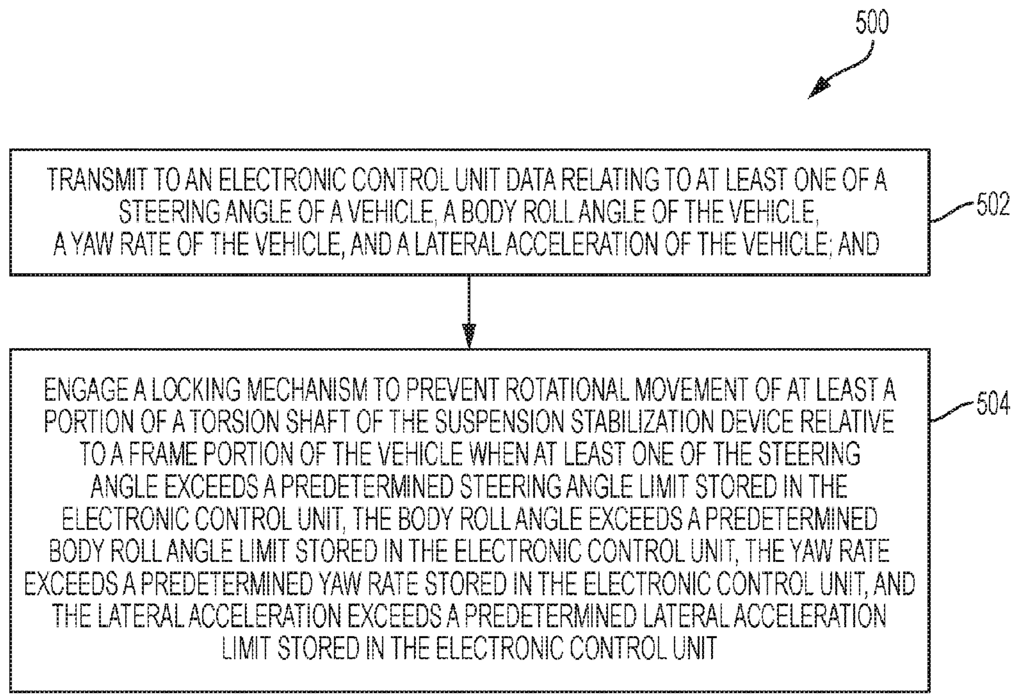
FIG. 5 is a flow chart illustrating a method of controlling an anti-roll stabilizer device according to one or more exemplary embodiments of the disclosed subject matter.

FIG. 5 is a flowchart showing a method 500 of stabilizing a vehicle suspension. The method 500 includes action 502, which comprises transmitting to an electronic control unit data relating to at least one of a steering angle of the vehicle, a body roll angle of the vehicle, a yaw rate of the vehicle, and a lateral acceleration of the vehicle. Action 504 comprises engaging a locking mechanism to prevent rotational movement of at least a portion of a torsion shaft of the suspension stabilization device relative to a frame portion of the vehicle when at least one of the steering angle exceeds a predetermined steering angle limit stored in the electronic control unit, the body roll angle exceeds a predetermined body roll angle limit stored in the electronic control unit, the yaw rate exceeds a predetermined yaw rate stored in the electronic control unit, and the lateral acceleration exceeds a predetermined lateral acceleration limit stored in the electronic control unit.

In the description above, reference is made to the electronic control unit (ECU) as a single component. However, this configuration is merely an example and is subject to a variety of implementation-specific variations. For example, in some embodiments, the functions described in reference to the ECU may be performed across multiple ECUs or among multiple components of the ECU. Further, the ECU may include one or more structural components that enable the ECU to function as a controller. The ECU, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system of the controller to operate the logic or portions of the logic presented in the methods disclosed herein. For example, in certain embodiments, the ECU may include computer code disposed on a computer-readable storage medium or a process controller that includes such a computer-readable storage medium. The computer code may include instructions, for example, for initiating a control function to engage or disengage the locking mechanisms of the suspension stabilization devices

110L, 110R (FIG. 1) based on feedback received from another component of the vehicle, such as from sensors configured to generate data related to steering wheel angle, lateral acceleration, body roll angle, yaw rate, ride height, etc.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiments described herein be considered as exemplary only.

What is claimed is:

1. A suspension stabilization system, comprising:

a stabilizer bar having an end configured to connect to a suspension component of a vehicle;

a torsion shaft with an end connected to the stabilizer bar; and a locking mechanism configured to prevent rotation of at least a portion of the torsion shaft relative to a portion of a frame of the vehicle when in a locked configuration.

2. The suspension stabilization system of claim 1, wherein the stabilizer bar is connected to the torsion shaft via a splined interface.

3. The suspension stabilization system of claim 1, wherein the stabilizer bar and the torsion shaft comprise a single, unitary component.

4. The suspension stabilization system of claim 1, wherein at least a portion of the torsion shaft and at least a portion of the locking mechanism are disposed within a housing attached to the portion of the frame of the vehicle.

5. The suspension stabilization system of claim 1, wherein the locking mechanism comprises a pinion gear positioned on the torsion shaft and a sliding lock gear configured to slide axially within a housing, and wherein the pinion gear and the sliding lock gear each comprise gear teeth configured to intermesh when the sliding lock gear is in an engaged position.

6. The suspension stabilization system of claim 5, wherein the sliding lock gear comprises external protrusions configured to slide within recesses of the housing and prevent rotation of the sliding lock gear with respect to the housing.

7. The suspension stabilization system of claim 6, wherein the locking mechanism comprises an electronic solenoid connected to an actuator fork configured to move the sliding lock gear from a disengaged position to an engaged position when the solenoid is energized.

8. The suspension stabilization system of claim 7, further comprising an electronic control unit (ECU) configured to activate the solenoid based on at least one of steering wheel angle, body roll angle, and lateral acceleration.

9. The suspension stabilization system of claim 8, further comprising a position sensor disposed proximate the torsion shaft and configured to transmit a signal related to the rotational position of the torsion shaft to the ECU.

10. The suspension stabilization system of claim 9, wherein the position sensor comprises a tone ring disposed on the torsion shaft.

11. The suspension stabilization system of claim 1, wherein the locking mechanism comprises an actuator configured to engage a friction shoe disposed on a friction surface of the torsion rod.

12. The suspension stabilization system of claim 11, wherein the friction surface of the torsion rod comprises a friction surface of a bushing disposed around an outer diameter of the torsion rod.

13. A vehicle, comprising:

a suspension stabilization device, comprising:

a stabilizer bar connected to a suspension component of the vehicle;

a torsion shaft connected to the stabilizer bar; and a locking mechanism configured to selectively immobilize at least a portion of the torsion shaft with respect to a portion of a frame of the vehicle.

14. The vehicle of claim 13, wherein the suspension component of the vehicle comprises a control arm.

15. The vehicle of claim 13, wherein the suspension component of the vehicle comprises a strut.

16. The vehicle of claim 13, wherein the locking mechanism is configured to engage and disengage based on signals from an electronic control unit of the vehicle.

17. The vehicle of claim 16, wherein the electronic control unit is configured to control actuation of the locking mechanism based on at least one of steering wheel angle, lateral acceleration, and body roll angle.

18. The vehicle of claim 13, wherein the vehicle comprises at least two suspension stabilization devices, and wherein the at least two suspension stabilization devices are configured as independent units.

19. A method for stabilizing a vehicle suspension, comprising:

transmitting to an electronic control unit data relating to at least one of a steering angle of the vehicle, a body roll angle of the vehicle, a yaw rate of the vehicle, and a lateral acceleration of the vehicle; and engaging a locking mechanism to prevent rotational movement of at least a portion of a torsion shaft of a suspension stabilization device relative to a frame portion of the vehicle when at least one of the steering angle exceeds a predetermined steering angle limit stored in the electronic control unit, the body roll angle exceeds a predetermined body roll angle limit stored in the electronic control unit, the yaw rate exceeds a predetermined yaw rate stored in the electronic control unit, and the lateral acceleration exceeds a predetermined lateral acceleration limit stored in the electronic control unit.

20. The method of claim 19, wherein transmitting to the electronic control unit the data related to the body roll angle of the body of the vehicle comprises transmitting to the electronic control unit ride height data for one or more wheels of the vehicle.

* * * * *